US012516488B2

(12) United States Patent
Reid et al.

(10) Patent No.: US 12,516,488 B2
(45) Date of Patent: Jan. 6, 2026

(54) LAMINOUS MANWAY COVER GASKET

(71) Applicant: VSP TECH., INC., Prince George, VA (US)

(72) Inventors: Daniel Ferris Matthews Reid, Kingwood, TX (US); Alfred Fitzgerald Waterland, III, Kilmarnock, VA (US); Jeffery William Wilson, Colonial Heights, VA (US)

(73) Assignee: VSP TECH., Inc., Prince George, VA (US)

( * ) Notice: Subject to any disclaimer, the term of this patent is extended or adjusted under 35 U.S.C. 154(b) by 0 days.

(21) Appl. No.: 18/494,049

(22) Filed: Oct. 25, 2023

(65) Prior Publication Data

US 2024/0133148 A1   Apr. 25, 2024
US 2024/0229408 A9   Jul. 11, 2024

Related U.S. Application Data

(60) Provisional application No. 63/419,138, filed on Oct. 25, 2022.

(51) Int. Cl.
*E02D 29/14*     (2006.01)
*F16J 15/10*     (2006.01)
*F16J 15/12*     (2006.01)

(52) U.S. Cl.
CPC .......... *E02D 29/149* (2013.01); *F16J 15/102* (2013.01); *F16J 15/108* (2013.01); *F16J 15/122* (2013.01)

(58) Field of Classification Search
CPC ........ F16J 15/102; F16J 15/108; F16J 15/122; F16J 15/104; F16J 15/12; E02D 29/149
See application file for complete search history.

(56) References Cited

U.S. PATENT DOCUMENTS

| | | | | |
|---|---|---|---|---|
| 5,466,531 | A * | 11/1995 | Tippett | B32B 27/32 156/286 |
| 5,527,047 | A * | 6/1996 | Waterland, III | F16J 15/125 277/610 |
| 6,824,140 | B2 | 11/2004 | Frew et al. | |
| 7,455,301 | B2 | 11/2008 | Ragsdale et al. | |
| 8,066,843 | B2 | 11/2011 | Ragsdale et al. | |
| 9,701,388 | B2 * | 7/2017 | Busby | F16J 15/123 |
| 2004/0175571 | A1 * | 9/2004 | Buerger | F16J 15/104 428/688 |
| 2005/0116427 | A1 * | 6/2005 | Seidel | F16L 23/18 277/610 |

* cited by examiner

*Primary Examiner* — Christine M Mills
*Assistant Examiner* — L. Susmitha Koneru
(74) *Attorney, Agent, or Firm* — Fantastic IP Consulting; Eduardo E. Drake

(57) ABSTRACT

A laminous processed manway cover gasket includes an insert and a plurality of ePTFE layers of membranes wrapping the insert to result in isolation of the insert. In example, the isolation may result from a laminous, thermo-mechanical process that fuses together each ePTFE layer of membrane of the plurality of ePTFE layers of membranes.

7 Claims, 8 Drawing Sheets

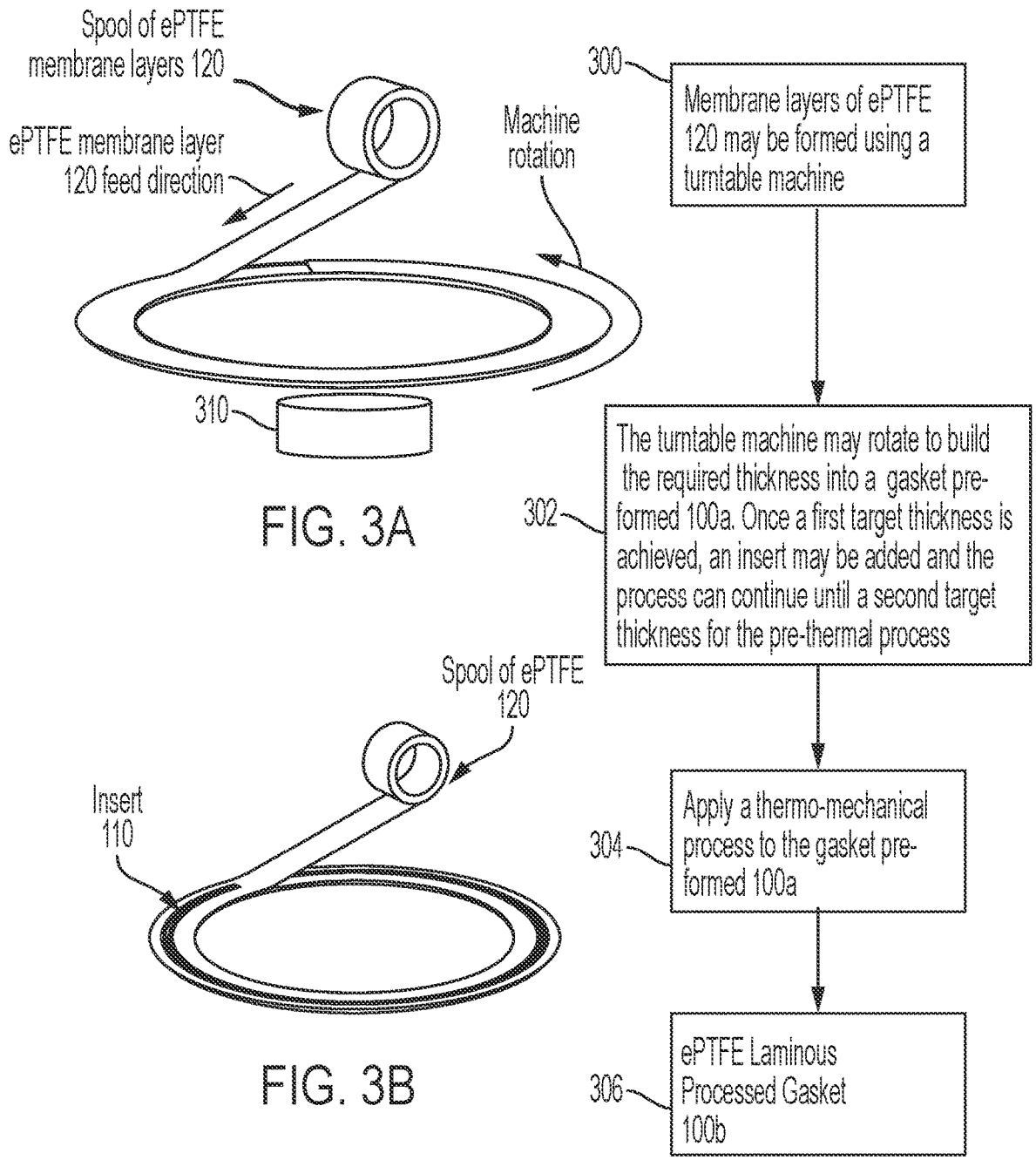

LAMINOUS MANWAY COVER GASKET

CROSS-REFERENCE TO RELATED APPLICATIONS

This application claims the benefit of U.S. Provisional Application No. 63/419,138, filed Oct. 25, 2022, the contents of which is incorporated herein by reference in its entirety.

BACKGROUND

Composite gaskets have been utilized in the chemical processing and transportation industries in the last 20 years for gaskets (flanges) with specialized geometries. The combination of expanded Polytetrafluoroethylene (ePTFE) composite being applied to a corrugated metal insert with a bonding agent has made these ePTFE composite gaskets successful. This distinct blend of materials allows the finished gasket products to seal at lower stresses and combat the issue of material relaxation with the embedded corrugated metal insert. Specifically in the transportation industry, these ePTFE composite gaskets have been installed in over half a million connections without a single reported Non-Accidental Release (NAR), transforming these composite gaskets into the most reliable and trusted manway cover gasket in the industry.

However, there are numerous applications that have unique design characteristics that limit the effective use of the current technology. For example, applications involving non-metallic or aluminum flanges, large flanges with small diameter fasteners, or flanges with limited quantity of fasteners. For these critical installation applications, the previously technology ePTFE composite gaskets cannot be utilized, and end-users must sacrifice performance and reliability and use an elastomeric material. Elastomeric materials may be capable of sealing at extremely low stresses; yet are not mechanically stable, resulting in long term reliability issues. With the need to seal these complex connections increasing, technological advancements are required to avoid leaks in these critical applications.

FIG. 7 is a diagram of an ePTFE composite manway cover gasket according to the related art. In FIG. 7, according to the ePTFE composite manway cover gasket 600 of the previous technology, a joint or seam 602 that extends from the inner diameter (ID) of the gasket to the outer diameter (OD) in at least one location is visible.

ePTFE composite gaskets 600 manufactured utilizing the previous technology have at least one joint 602, which leaves a joint or seam 602 in the finished product that extends from the ID of the gasket to the OD (FIG. 7). While these previous technology ePTFE composite gaskets 600 may be fully encapsulated at the ID 604, at the OD 606, the insert 110 can be partially exposed at the joint or seam 610 formed due to the composite material of the ePTFE composite gasket being bonded at 612 to the insert 110 with adhesive. The exposed adhesive prevents compliance with U.S. Food and Drug Administration (FDA) and pharmaceutical services.

Therefore, the previous ePTFE composite gaskets 600 result in a seam/joint across the cross-section at one (or multiple) sections of the finished product (FIG. 7). The joint or seam 602 in the previous technology will not result in a leakage issue if properly installed. While the previous technology ePTFE composite gasket has been designed for multiple reuses; some end-users avoid this previous technology ePTFE composite gasket technology because of what the end-users believe to be a "visible leak path" based on the visible joint or seam 602, resulting in the premature removal and replacement of the previous technology ePTFE gasket.

In addition, prior methods for manufacturing ePTFE composite gaskets may not allow for customization of important gasket characteristics for arduous applications.

BRIEF DESCRIPTION OF DRAWINGS

Various aspects and advantages will become more apparent and more readily appreciated from the following description of examples, taken in conjunction with the accompanying drawings, of which:

FIGS. 3A and 3B are diagrams, including a flow chart, of a method of manufacturing an ePTFE laminous processed manway cover gasket, according to an example;

DETAILED DESCRIPTION

Figure 1:
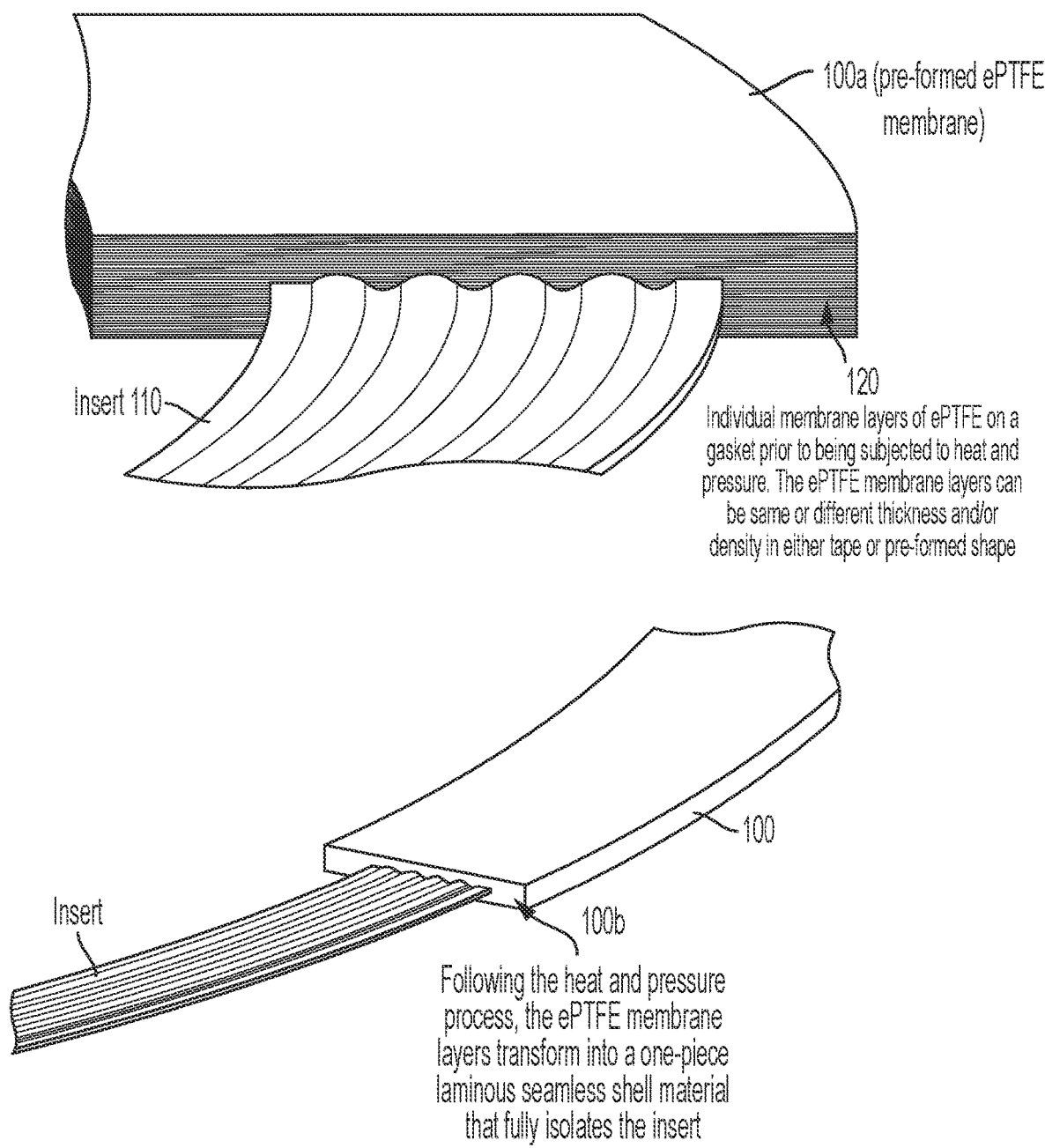
FIG. 1 is a diagram of an ePTFE laminous processed manway cover gasket, according to an example.

FIG. 1 is a diagram of an ePTFE laminous processed composite manway cover gasket, according to an example. In an example, a laminous processed gasket 100 (may be referred to as gasket 100) for a manway may include an insert 110 and a plurality of ePTFE membrane layers 120 (may be referred to as ePTFE membrane layer 120) wrapping the insert to isolate the insert 110, the isolation resulting from a thermo-mechanical process to fuse together each ePTFE membrane layer of the plurality of ePTFE membrane layers into a laminous seamless form.

An ePTFE membrane layer of the ePTFE membrane layers 120 refers to at least one layer of an ePTFE membrane significantly thinner than the ePTFE sheet layer used in the prior technology ePTFE composite gasket. The previous ePTFE composite gasket utilized thick, ePTFE strip material slit from commercially available ePTFE gasket sheet material. More particularly, the ePTFE gasket sheets used to manufacture the previous technology ePTFE composite gasket typically has a disadvantageously broad density ranging from about 0.5 g/cc (grams per cubic centimeter) to about 1.1 g/cc (0.6 g/cc range). The large density range of the commercially available ePTFE gasket sheet may cause an uncontrollably wide variation in mechanical properties and sealing performance of the previous technology finished ePTFE composite gasket in a manway.

Figure 4A:
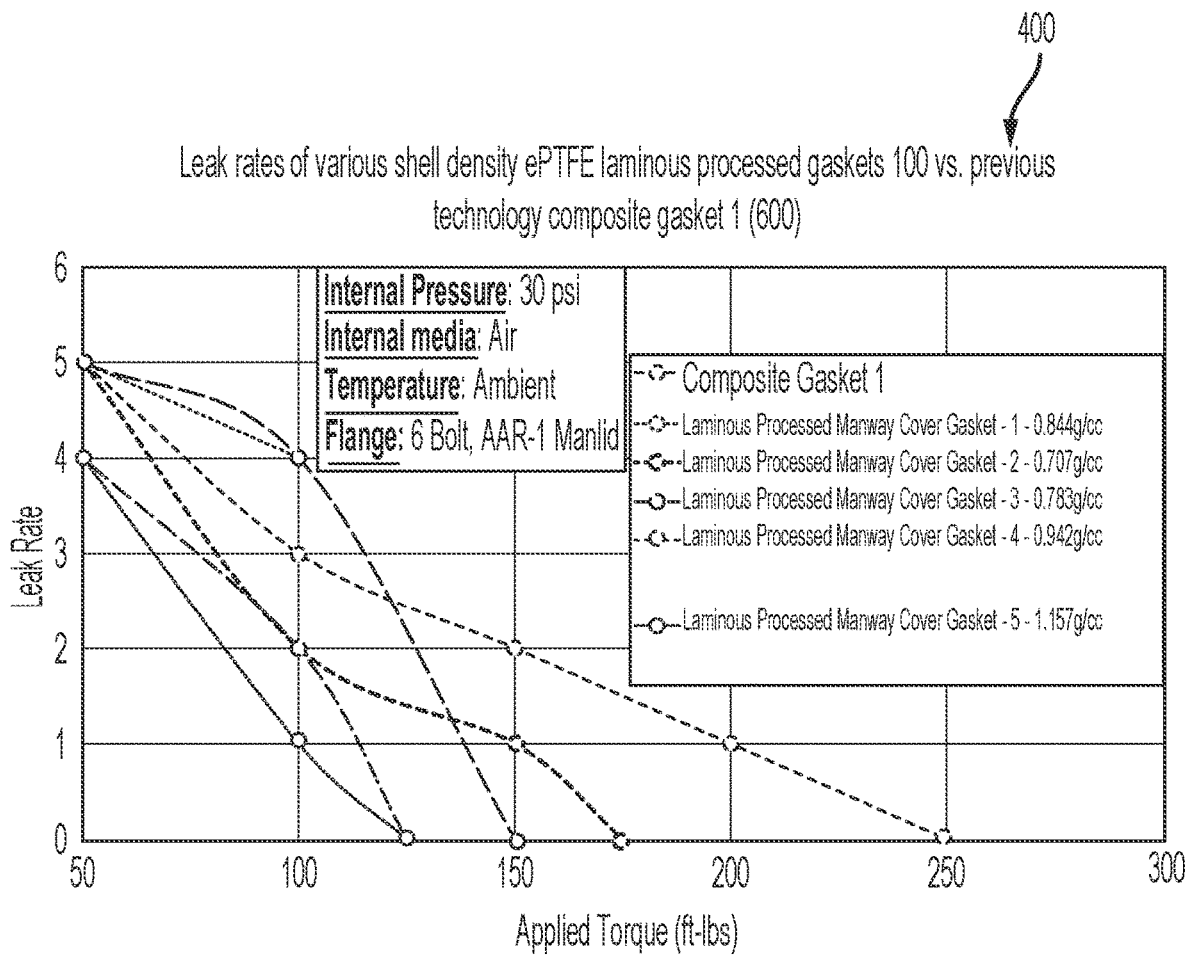
FIG. 4A is a line graph of leak rate test results comparing a previous technology ePTFE composite gasket and ePTFE laminous processed manway cover gaskets of various shell densities according to the described examples.

In an example, the density of an ePTFE membrane 120 for the ePTFE laminous processed gasket 100 ranges from 0.47 g/cc to 0.53 g/cc (0.06 g/cc range), which is a substantially narrower density range of a membrane 120 than the previous technology density range of 0.6 g/cc range, thereby correlating to at least an equally narrow density range of the finished ePTFE laminous processed gasket 100. In another example, specific target densities of the finished laminous processed gasket, the ePTFE shell 100b can be targeted in a range from about 0.5 g/cc to 1.5 g/cc, in an example, more preferably about 0.7 g/cc to 1.3 g/cc, which then provides for the specific needs of greater types of applications. In an example, the density range of the ePTFE shell 100b can be about 0.7 g/cc to 1.3 g/cc. FIG. 4A outlines the variation in sealing performance resulting from varying the density of the ePTFE shell 100b of the ePTFE laminous processed gasket 100; while FIG. 5 describes the consistency of mechanical integrity. The narrower density range of ePTFE membrane layer 120 allows customization of important gasket characteristics for arduous applications when manufacturing the ePTFE laminous processed gasket 100.

In an example, an ePTFE laminous processed gasket 100 for a manway may include a laminous seamless shell 100b composed of a plurality of ePTFE membrane layers 120 fused together in a laminous seamless form, and an insert isolated in the laminous seamless shell 100b to form the ePTFE laminous processed gasket 100. In an example, the ePTFE laminous processed gasket 100 may include an insert 110 and a composition including a plurality of expanded Polytetrafluoroethylene (ePTFE) membrane layers isolating the insert in a seamless and laminous manner. In an example, a density of the laminous seamless shell is about 0.5 g/cc to 1.5 g/cc. In an example, a density of the laminous seamless shell is about 0.700 g/cc to 1.3 g/cc. In example, the laminous seamless shell 100b results from a laminous process including a thermo-mechanical process to fuse together the ePTFE membrane layers into the laminous seamless shell, based on layers of ePTFE membranes with the insert. In an example, a thickness of an ePTFE membrane layer of the ePTFE membrane layers before the thermo-mechanical process is about 0.001 in (inches)-0.010 in, with widths from about 2.000 in to 8.000 in, and with pre-formed shape widths from about 0.500 in to 8.000 in.

Figure 2:
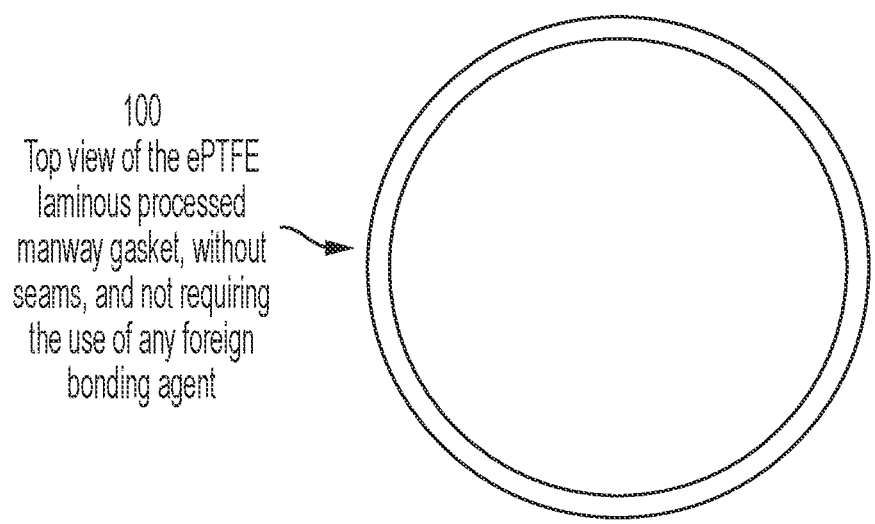
FIG. 2 is a top view of an ePTFE laminous processed manway cover gasket, according to an example.

FIG. 2 is a top view of an ePTFE laminous processed manway cover gasket, according to an example. Following the thermo-mechanical, for example, a heat and pressure process, the ePTFE membrane layers 120 may be transformed into a single-piece laminous shell material that fully isolates the insert 110 without any seams in form of a seamless isolation. As illustrated in FIG. 2, the ePTFE laminous processed gasket 100 according to an example may be without any seam.

Figure 7:
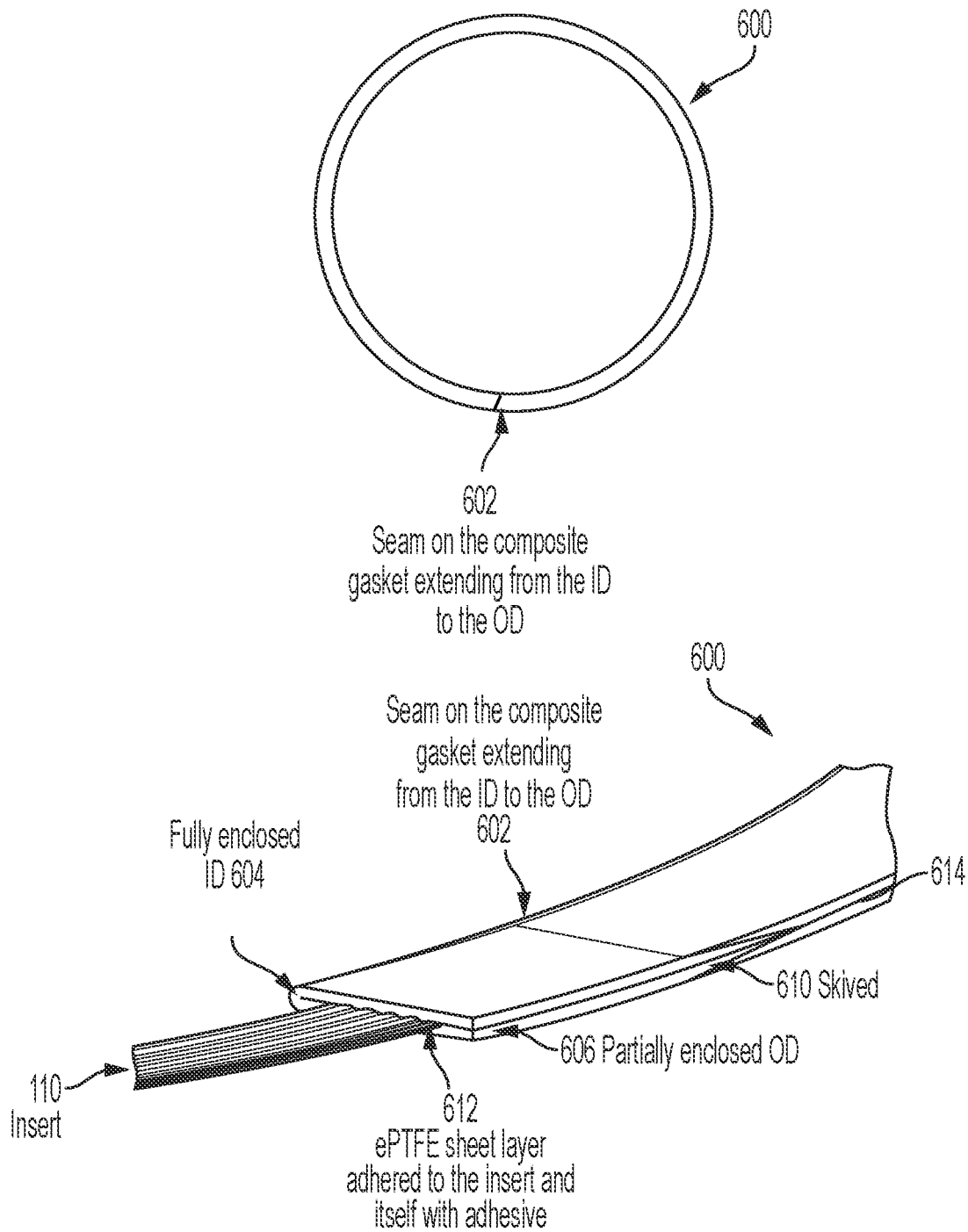
FIG. 7 is a diagram of an ePTFE composite manway cover gasket according to the related art.

FIG. 7 is the diagram of an ePTFE composite manway cover gasket according to the related art. The examples of the present invention effectively overcome the limitations of the previous technology ePTFE composite gasket 600 by an ePTFE laminous processed gasket 100 constructed from multiple wraps of individual or continuous ePTFE membrane layers 120 to completely isolate an insert through a laminous, thermo-mechanical process that fuses together each membrane layer of ePTFE to yield a solid ePTFE shell fully isolating the insert. This novel design provides end-users with an ePTFE laminous processed gasket 100 having unique and customized mechanical and sealing characteristics that are unmatched by any other previous technology ePTFE composite gasket currently available.

In an example, the laminous process to manufacture the ePTFE laminous processed gasket 100, directly utilizes multiple ePTFE membranes in form of a tape (see FIG. 3B, spool), or discs (pre-formed—defined ID and OD—shape—see FIG. 1, 100a), layered in a mold or jig corresponding to a desirable ID or OD of a resultant gasket being produced. Once the desired gasket thickness is obtained with the layered ePTFE membranes, for example, in form of discs, or a tape, a thermo-mechanical process is used to coalesce the layered laminate into a solid, one-piece laminous seamless shell form. No adhesive or foreign bonding agents are used in the laminous process. The construction of the present ePTFE laminous processed gasket 100 includes the use of ePTFE membranes 120 on the ID and OD sides of the ePTFE laminous processed gasket 100, extending beyond the insert 110 to allow the ePTFE laminous processed gasket to have the flexibility required to fit into a retaining groove of the manway cover and remain properly positioned.

Previous technology ePTFE composite gaskets may be manufactured from thicker ePTFE sheet material of a finite initial thickness folded around the ID of a metal insert and require a foreign bonding agent to secure the ePTFE sheet in place around the insert and to join the two ends of the strips. The resultant previous technology ePTFE composite gasket produces a gasket with a seam at the OD, potentially allowing for corrosion of the embedded insert from outside the previous technology ePTFE composite gasket. Overlapping and bonding the two ends of the tape/strip creates a seam extending from the ID to the OD, which creates some concern with end-users that this could facilitate a leak path across the previous technology ePTFE composite gasket and precludes use of such previous technology ePTFE composite gasket in food/pharma services.

Construction:

FIGS. 3A and 3B are diagrams, including a flow chart, of a method of manufacturing an ePTFE laminous processed manway cover gasket, according to an example. In an example, the ePTFE laminous processed gaskets 100 as manufactured with the improved method do not contain a seam on the face of the finished product and completely isolate by way of encapsulation the insert 110 at both the ID and the OD sides to isolate the insert 110 during the laminous process (see FIG. 2). In an example, a method of manufacturing an ePTFE laminous processed gasket 100 having an annular shape may involve at 300 taking a single strip of thin membrane layer ePTFE 120 wrapped on a spool and transferring the ePTFE membrane layer 120 to an annular plate rotatable by a machine 310 with a defined ID and OD through a winding process. In an example, a small amount of ePTFE membrane layer 120 overhangs on the plate on the ID and OD to ensure the insert 110 is completely laminated in the finished gasket 100. As the plate of the machine 310 rotates, a first set of ePTFE membrane layers 120 builds up layer by layer, increasing a thickness of the first set of ePTFE membrane layers 120 proportionate to the number of thin membrane layers of the ePTFE 120. Once a specific thickness of the first set of ePTFE membrane layers 120 on the bottom side has been achieved, at 302, the insert 110 is placed on the first set of ePTFE membrane layers 120 and concentrically centered as illustrated in FIG. 3B. The same wrapping procedure continues to be utilized for a second set of ePTFE membrane layers 120 until the desired thickness of second set of ePTFE membrane layers 120 is achieved on the top side of the insert 110.

In an example, a method of manufacturing a laminous processed gasket 100 may include forming a first set of membrane layers of ePTFE in a geometric shape; disposing an insert on a top layer of the first set of membrane layers of ePTFE; forming a second set of membrane layers of ePTFE on the insert and the first set of membrane layers of ePTFE, resulting in a pre-processed first shell with the insert; and applying a thermo-mechanical process to the pre-pre-processed first shell to fuse together each ePTFE membrane layer of the first set of membrane layers of ePTFE and the second set of membrane layers of ePTFE into a post-processed second shell in a laminous seamless form, resulting in a single-piece seamless shell having higher and lower density regions providing isolation of the insert 110. The thermo-mechanical process may include applying temperatures ranging from about 600° F. to about 675° F. and a surface pressure ranging from about 3 psi to about 60 psi for a dwell time commensurate with the surface pressure applied.

In an example, the laminous process allows for varying facing thickness on each side of the insert 110, which may be desirable. Once the membrane layering of the ePTFE is completed based on a tape or pre-formed shape of membranes, at 304, the gasket, for example, based on pre-formed shape membranes 100a, or based on a tape, is transferred to a cleaned surface so the assembly can be introduced to a thermo-mechanical process for the individual membrane layers of ePTFE 120 to coalesce together, creating, at 306, a unitized laminous processed gasket 100 whose insert 110 is fully isolated. Typically, at 304, a thermo-mechanical process requires a heat source capable of applying temperatures ranging from about 600° F. to about 675° F. and pressures ranging from about 3 psi (pound per square inch) to about 60 psi for a dwell time commensurate with the applied pressure. If proper conditions are not observed during the thermo-mechanical process, the material can begin to sublimate, the individual membrane layers of the ePTFE 120 may not fully coalesce with each other, or the desired final density of the ePTFE membrane layers 120 and/or the ePTFE membrane layers 120 with the insert 110, may not be achieved.

In an example construction of an ePTFE laminous processed gasket 100 for a manway cover, the ePTFE laminous processed gasket 100 features a completely bonded construction, as outer membrane layers of the ePTFE 120 are thermally bonded to isolate an insert during the manufacturing process. The individual ePTFE membrane layers 120 may be coalesced with heat and light pressure, thus eliminating the need to use adhesives on any component of the ePTFE laminous processed gasket 100. The ePTFE laminous processed gasket 100 may be manufactured from multiple wraps or layers of ePTFE membrane 120 in form of a tape or discs. The ePTFE laminous processed gasket 100 may have at least one characteristic among characteristics of density, dimension (ID and OD), thickness, and geometry (shape).

In an example, a thickness and/or density of a shell in form of an ePTFE laminous processed gasket 100, including a thickness of ePTFE membrane layers 120, may be 100% or infinitely customizable. For example, a thickness of the ePTFE laminous processed gasket 100 (i.e., ePTFE membrane layers 120 with the insert 110), may typically be about 0.093 in to 0.250 in; a density of the ePTFE membrane layers 120 without the insert 110 (i.e., the shell), may be about 0.700 g/cc to 1.3 g/cc; dimensions of ID and OD may be according to application, and geometries, for example, annular, oval, an elliptical shape, rectangular or round edge wound, rectangular or square flat wound, obround, polygon, can be customizable to meet the needs of the end-user's applications. The thickness and/or density characteristics of an ePTFE laminous processed gasket 100, including thickness and/or density of an ePTFE membrane layer 120 before and/or after a laminous process, may be determined by a measuring instrument, a micrometer, a caliper, and/or a scale.

The outer ePTFE membrane layers 120 may be made from multiple wraps or layers of ePTFE membranes 120. ePTFE membranes 120 may be a superior gasket or gasket-facing material, because the material is 100% ePTFE, which may be processable to create biaxial-oriented (stretched both horizontally and vertically (x and y axis)) gaskets (or ePTFE layers) forming a lattice structure with air voids. The lattice structure resembles fibers and may be formed during the stretching process and creates a more compressible material that significantly fights creep/cold flow (material flowing outward) and resultant joint relaxation. The air voids may make the outer ePTFE membrane layers 120 of the gasket 100 soft and highly compressible, which may be ideal for sealing bolted flanged connections. The construction of the ePTFE laminous processed gasket 100 allows the material to conform to imperfections on the manway cover and/or the nozzle of a tank car, providing the end-user with a tighter (lower leakage) connection. In addition, ePTFE laminous processed gaskets 100 utilizing an insert create mechanical enhancements to the base ePTFE membrane layers material providing increased stiffness (for installation purposes) and critical dynamic response capabilities to counteract the adverse effects of vibration and resulting gasket or joint relaxation.

In an example, the density of ePTFE membrane layers 120 to manufacture the ePTFE laminous processed manway cover gaskets 100 advantageously can exhibit a much narrower density range from about 0.700 g/cc to 1.3 g/cc versus the previous technology ePTFE composite gasket 600. In an example, a single ePTFE membrane layer of the ePTFE membrane layers 120 may typically have a thickness of about 0.001 in-0.010 in in both tape or pre-formed shape (disk), with widths from about 2 in to 8 in for the tape form and with pre-formed shape widths from about 0.5 in to 8 in. In contrast, the previous technology ePTFE composite gasket 600 utilizes ePTFE strips slit by way of cutting and/or folding from commercially available ePTFE sheet materials. These previous technology ePTFE sheets have a broad range of densities from 0.5 g/cc to 1.1 g/cc. As a result of the inconsistent sheet densities, there is no opportunity in the previous technology to customize the final gasket density and thus control important composite gasket performance characteristics and capabilities, so that the final gasket 600 may have reduced soft spots and hard spots. The initial higher density of the ePTFE strips in the previous technology ePTFE composite gasket 600 and their extreme density variation results in a finished gasket with soft and hard spots, requiring excessive gasket stress to repeatedly generate an effective seal as pointed out in paragraph above.

As the improved ePTFE laminous processed gaskets 100 are instead manufactured in a laminous process, the properties of the ePTFE materials can be selectively altered during the membrane layering process to produce finished gaskets with further enhanced properties. For example, employing outer (top and bottom) layers of ePTFE membrane layers 120 with a higher density than the inner layers. In an example, by using a less processed form of the base material (thin ePTFE membrane layers 120 in form of discs or tapes) to manufacture the ePTFE laminous processed gaskets 100 (instead of existing previous technology commercial ePTFE sheet), there now exists the opportunity to produce a finished product ePTFE laminous processed gasket 100 with an ePTFE shell density range of about 0.7 g/cc to about 1.3 g/cc, depending on the number of ePTFE membrane wraps/layers 120 and the degree of compression allowed during the thermo-mechanical coalescing process. This flexibility results in the design and manufacture of the ePTFE laminous processed gasket 100 with varying mechanical and sealing characteristics. The finished product in form of the ePTFE laminous processed gasket 100 may achieve one of the most important goals, a material with lower stress to seal than other commercially available products while remaining a robust gasket design. Again, there is no opportunity to manage or control the final product density or the density variation with the prior technology ePTFE composite gaskets.

In an example, the embedded insert 110 can be metallic, for example, 316 stainless steel, Alloy C276, Inconel 600, etc., or non-metallic, for example, filled PTFE, fiberglass, other polymers, etc.) material with a unique profile, for example, corrugated, square, hexagonal, serrated, etc., which can be either extremely rigid or exhibit varying degrees of malleability, providing exceptional mechanical performance in high, medium, or low gasket stress applications across a wide temperature range (−450° F. to 600° F.) and chemical resistance requirements which can be tailored to the end-user requirements. These inserts 110 can vary in thickness (typically 0.030 in to 0.125 in for non-metallic and 0.030 in-0.060 in for metal), width (dependent on the cross-section of the gasket), and geometrical profiles, for example, if the insert 110 is corrugated, the insert 110 can have between 2-10 corrugation peaks, depending on the cross-section. For example, the insert 110 could be metal with a corrugated geometry to significantly reduce the ePTFE laminous processed gaskets' 100 contact area and allow the gasket to act like a spring, thus "live-loading" the material so the gasket 100 can handle pressure or thermal changes along with heavy vibrations of the connection.

Performance:

The ePTFE laminous processed manway cover gasket 100 described herein has been evaluated using an Association of American Railroads manway cover style 1 (commonly referred to as an AAR-1 manway cover) at the typical bubble leak test (BLT) conditions, air pressure is 30 psig (pounds per square inch gauge) at ambient temperatures, and the generated results were compared to other, commercially available manway cover gaskets.

Figure 4B:
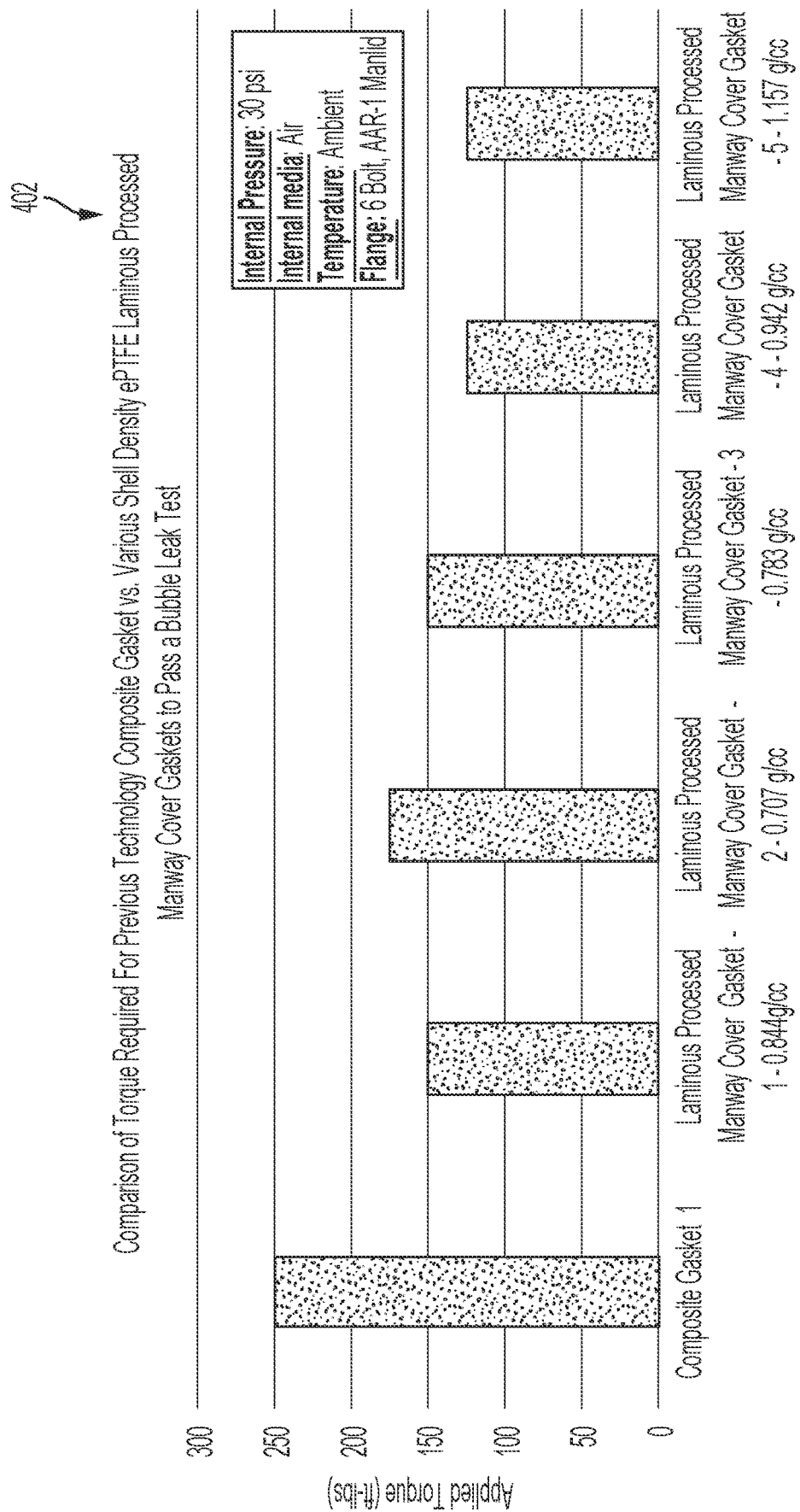
FIG. 4B is a bar chart of the leak rate test results in FIG. 4A.

FIG. 4A is a line graph of leak rate test results comparing a previous technology ePTFE composite gasket and ePTFE laminous processed manway cover gaskets of various shell densities according to the described examples. The various shell densities of the ePTFE laminous processed gaskets in FIG. 4A are Laminous Processed Gasket-1-0.844 g/cc; Laminous Processed Gasket-2-0.707 g/cc; Laminous Processed Gasket 3-0.783 g/cc; Laminous Processed Gasket-4-0.942 g/cc; and Laminous Gasket-5-1.157 g/cc. FIG. 4B is a bar chart of the leak rate test results in FIG. 4A with the various shell densities of the ePTFE laminous processed gaskets indicated.

In FIG. 4A, the leak rate of the BLT may be rated as follows:

0 is zero bubbles visible after a 5-minute dwell time under pressure.

1 is minor/small amount of bubbles visible after a 5-minute dwell time under pressure.

2 is small to medium amount of bubbles visible after a 5-minute dwell time under pressure.

3 is medium amount of bubbles visible after a 5-minute dwell time under pressure.

4 is medium to excessive bubbles visible after a 5-minute dwell time under pressure.

5 is excessive bubbles visible after a 5-minute dwell time under pressure.

As indicated in the line graph 400, the leak rate for the prior technology composite gasket-1 600 is higher than the ePTFE laminous processed gaskets 1-5 (100) at applied torques up to 175 ft-lbs (foot-pound force), resulting in a lower required torque versus the prior technology gasket 600 requiring a torque of 200 ft-lb or higher to achieve a 0 leak rate.

Figure 5:
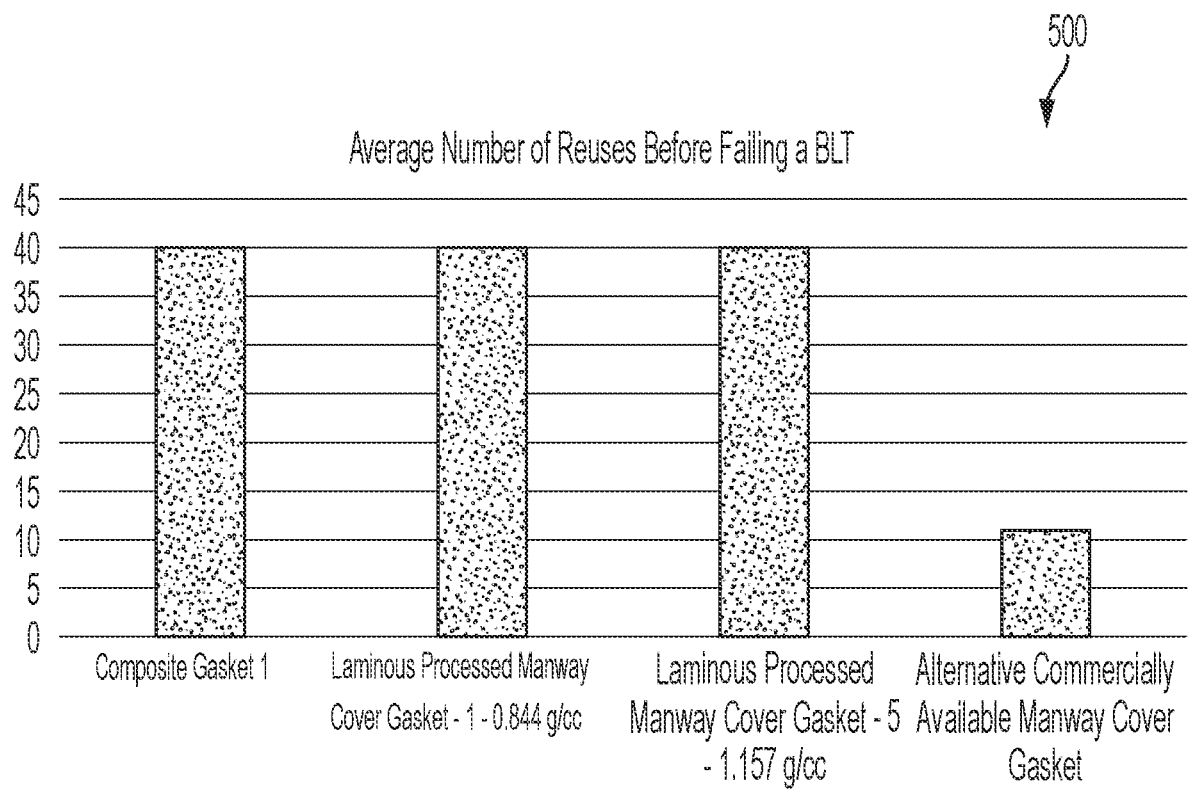
FIG. 5 is a bar chart of reuse test results using an ePTFE laminous processed manway cover gasket according to the described examples versus previous technology ePTFE composite gasket.

FIG. 5 is a bar graph of reuse test results using an ePTFE laminous processed manway cover gasket according to the described examples versus previous gasket technology. As an example, the railcar industry typically prefers manway cover gaskets that can be safely reused; therefore, in an example, as illustrated in the FIG. 5 bar graph 500, the novel ePTFE laminous processed manway cover gaskets 1, 4 (100) were compared against a prior technology ePTFE composite gasket 1 and another alternative exiting gasket to determine the baseline for the number of recommended gasket reuses before occurrence of gross physical deformation or the gasket failing a BLT. As indicated in the bar graph 500, the number of reuses of the ePTFE laminous processed gasket 100 is at least same as that of the prior technology composite gasket-1 600, and exceeds the number of successful reuses of the other alternative commercially available gaskets.

Figure 6:
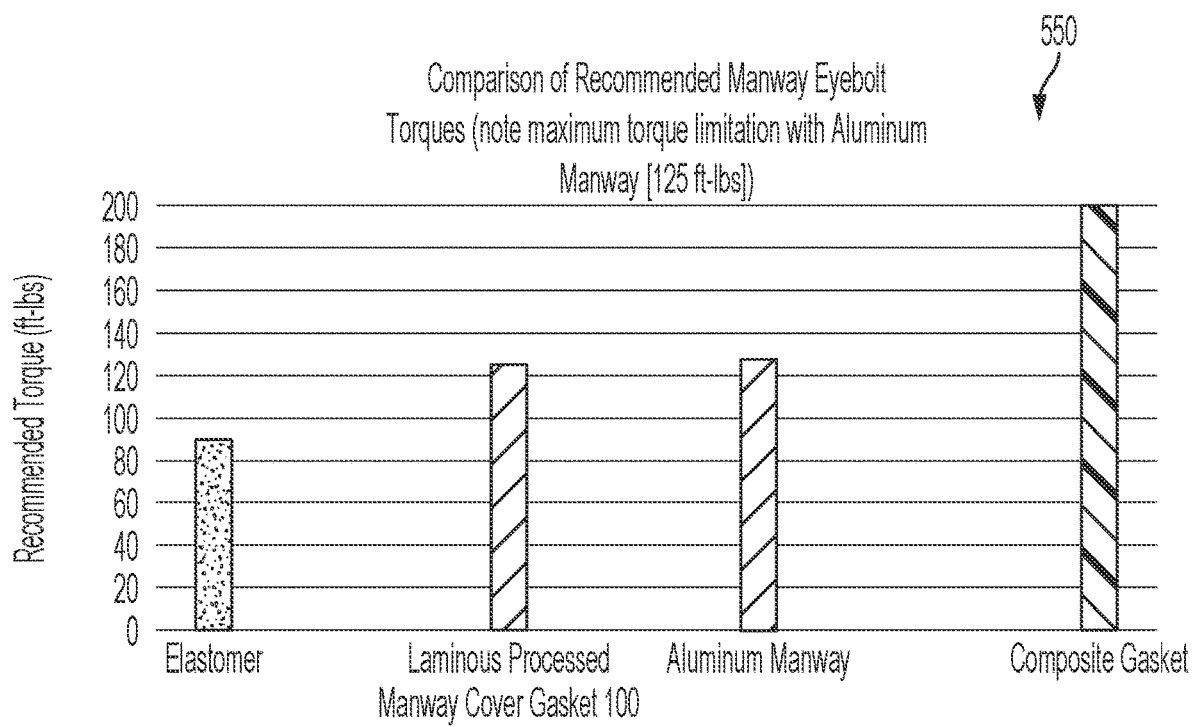
FIG. 6 is a bar chart comparing recommended torque values using various manway cover gaskets, including an aluminum manway cover, and an ePTFE laminous processed composite gasket according to the described examples.

FIG. 6 is a bar chart comparing recommended torque values using various manway cover gaskets, including an aluminum manway cover, and an ePTFE laminous processed composite gasket according to the described examples. As demonstrated in the bar chart 550, the ePTFE laminous processed gasket 100 has lower torque requirements vs. a prior technology (elastomer) gasket used on an aluminum manway and prior technology ePTFE composite gasket. A prior technology elastomer material gasket may have lower torque requirements than the ePTFE laminous processed gasket 100, however, the prior technology elastomer may have poor mechanical characteristics. For aluminum manway, a maximum torque may be 125 ft-lbs, so that the ePTFE laminous processed composite gasket 100 may meet torque requirements of the aluminum manway.

Examples of Advantages of the Improved ePTFE Laminous Processed Manway Cover Gasket 100:

Requires Lower Torque Values:

Hard gaskets utilized on 6-bolt, general purpose manway covers typically require 250 ft-lbs assembly torque to pass the industry standard bubble leak test (BLT). Higher torques may be required with some gasket materials and non-ideal manway/nozzle sealing surface conditions in order to compress/deform the gasket material into the manway cover and nozzle so the connection can pass the BLT. Concurrently, there are prior technology manway covers manufactured from weaker metals (Ex. Aluminum) and non-metallic materials; however, these materials cannot handle the excessive bolt loads from these torques, and other, less mechanically stable materials have to be used (for example elastomers). The ePTFE laminous processed gasket 100, according to the examples of the invention, requires 125 ft-lbs to 150 ft-lbs to pass a BLT, compared to the prior technology ePTFE composite gasket, which requires a substantially higher assembly torque of 250 ft-lbs. Given the significant reduction in the required torque, the example ePTFE laminous processed gaskets 100 can now be reliably used on aluminum and non-metallic manway covers (flanges) without damaging the connections.

FDA and Kosher Compliance:

No bonding agents are used to manufacture the ePTFE laminous processed gaskets 100, so the only components utilized are inherently FDA compliant; the laminous processed gasket 100 has been independently tested/verified to comply with US federal standards for FDA. Kosher compliance requirements are also met. The prior technology ePTFE composite gaskets may not meet these requirements.

Variable Density and Thickness:

The ePTFE laminous processed gaskets 100 is constructed of multiple wraps of a respective single membrane layer of ePTFE; therefore, both the finished gasket thickness and density can be controlled as needed to meet the end-user's mechanical and sealing performance requirements. As stated previously, there is only limited, insufficient control over finished gasket thickness and density with the previous technology ePTFE composite gaskets.

It may be noted that the initial density of the material before the thermo-mechanical process will typically be less than the finished/post-processed ePTFE laminous processed gasket 100.

Laminous Design:

Given the unique form of ePTFE membrane material used and the laminate/layered process according to the described examples, the resultant ePTFE gasket 100 is laminous.

The many features and advantages of the described examples are apparent from the detailed specification and, thus, it is intended by the appended claims to cover all such features and advantages of the examples that fall within the true spirit and scope thereof. Further, since numerous modifications and changes may readily occur to those skilled in the art, it is not desired to limit the inventive examples to the exact construction and operation illustrated and described, and accordingly all suitable modifications and equivalents may be resorted to, falling within the scope thereof.

The words "a," "an" and "the" are intended to include plural forms of elements unless specifically referenced as a single element. The term "at least" preceding a listing of elements denotes any one or any combination of the elements in the listing. In other words, the expression "at least one of . . . " when preceding a list of elements, modifies the entire list of elements and does not modify the individual elements of the list.

The term of "and/or" includes a plurality of combinations of relevant or listed items or any one item among a plurality of relevant or listed items.

The terms "comprise(ing)," "include(ing)," and "have(ing)" when used in this specification, specify the presence of stated features, functions, processes/operations, elements, and/or components, but do not preclude the presence or addition of one or more other features, functions, processes/operations, elements, components, and/or groups thereof.

In the specification, when an element (part or portion) is "coupled" to another element, the elements may be "directly connected", or may also be "connected" via another element therebetween. The "coupling" may be mechanical, or resin, plastic, by way of injection molding. Also, when a region "includes" an element, the region may further include another element instead of excluding the other element, unless otherwise differently stated.

While this disclosure has been shown and described with reference to examples thereof, it will be understood by one of ordinary skill in the art that various changes in form and details may be made therein without departing from the scope as defined by the claims.

The invention claimed is:

1. A composite manway gasket for a manway cover, the gasket comprising: a laminous seamless shell composed of at least five of expanded polytetrafluoroethylene membrane layers (ePTFE membrane layers) fused together in a laminous seamless form; and an insert material isolated in the laminous seamless shell, wherein a density of each ePTFE membrane layer of the ePTFE membrane layers has a pre-fusion thickness selected from a range about 0.001 inches to 0.010 inches and a pre-fusion density range of about 0.06 g/cc defined by a minimum density of about 0.47 g/cc and a maximum density of about 0.53 g/cc, and wherein the laminous seamless shell has a nominal density selected from a range of about 0.7 g/cc to 1.3 g/cc, based on total mass of the ePTFE membrane layers divided by total shell volume.

2. The composite manway gasket according to claim 1, wherein top ePTFE membrane layers and bottom ePTFE membrane layers, from among the ePTFE membrane layers, have a higher density than inner layers, from among the ePTFE membrane layers.

3. The composite manway gasket according to claim 1, wherein top ePTFE membrane layers and bottom ePTFE membrane layers, from among the ePTFE membrane layers, have a lower density than inner layers, from among the ePTFE membrane layers.

4. The composite manway gasket according to claim 1, wherein the insert material is at least one material from among materials including metal material and non-metallic material, with at least one material having at least one profile from among profiles including corrugated, square, hexagonal, and serrated.

5. The composite manway gasket according to claim 4, wherein the metal-inset-material may be at least one metal from among stainless steel, Alloy C276, Inconel 600, and the non-metallic-insert-material is at least one non-metallic material including filled PTFE, fiberglass, and polymers.

6. The composite manway gasket according to claim 1, the laminous seamless shell is a geometric shape from among geometric shapes of annular, oval, an elliptical shape, rectangular or round edge wound, rectangular or square flat wound, obround, and polygon.

7. The composite manway gasket according to claim 1, wherein the laminous seamless shell results from layers of ePTFE membranes in form of a tape, or a pre-formed shape, with widths from about 2.000 in. to 8.000 in.

* * * * *